United States Patent [19]

Gorman

[11] Patent Number: 5,070,820
[45] Date of Patent: Dec. 10, 1991

[54] PET WASTE DISPOSAL DEVICE

[76] Inventor: Fred L. Gorman, 1409 Oakwood Dr., Modesto, Calif. 95350

[21] Appl. No.: 195,149

[22] Filed: May 18, 1988

[51] Int. Cl.⁵ .............................................. A01K 1/01
[52] U.S. Cl. .................................... 119/161; 119/174
[58] Field of Search ............... 119/1; 4/300, 321, 345, 4/325

[56] References Cited

U.S. PATENT DOCUMENTS

| | | |
|---|---|---|
| 788,721 | 5/1905 | Johnson . |
| 2,831,488 | 4/1958 | Anderson . |
| 2,990,845 | 11/1958 | Sklash . |
| 3,520,003 | 7/1970 | Shaw ........................ 4/321 |
| 3,633,219 | 1/1972 | Byrd ........................ 4/321 |
| 3,688,742 | 9/1972 | McGee ...................... 119/1 |
| 3,734,057 | 5/1973 | Lee . |
| 3,771,491 | 11/1973 | Hunter . |
| 3,835,812 | 9/1974 | Edwards ................... 119/1 |
| 3,979,781 | 9/1976 | Jolicoeur ................. 4/420 |
| 4,052,756 | 10/1977 | Whiteman, Sr. et al. ... 4/425 |
| 4,075,718 | 2/1978 | Hargraves ................ 4/345 |
| 4,222,130 | 9/1980 | Roberts ................... 4/321 |
| 4,228,554 | 10/1980 | Tumminaro .............. 119/1 |
| 4,242,763 | 1/1981 | Walker . |
| 4,262,634 | 4/1981 | Piccone ................... 119/1 |
| 4,292,765 | 4/1981 | Russell ................... 4/321 |
| 4,376,319 | 3/1983 | Iwans ..................... 4/420 |
| 4,432,498 | 2/1984 | Clements . |
| 4,593,645 | 6/1986 | Dingler . |

Primary Examiner—Paul J. Hirsch
Attorney, Agent, or Firm—Fleit, Jacobson, Cohn, Price, Holman & Stern

[57] ABSTRACT

A pet waste disposal device in the form of a receptacle or fitting that is generally funnel shaped and provided with a reduced diameter lower end connected to the cleanout fitting conventionally provided for sewer systems and located externally of a residential home or other building with the receptacle including a pivotal closure lid to provide access thereto from any position exteriorly of the building and a water inlet to which a garden hose or other supply pipe is connected with the water inlet including a unique arrangement of nozzles for flushing and cleaning the interior surface of the receptacle so that pet waste may be picked up from the yard or other areas and deposited into the receptacle without entering the home or other building. The device may be constructed of metal or plastic and is connected to the cleanout adapter by utilizing conventional plumbing procedures and a control valve is provided for the water inlet to enable selective operation of the flushing operation.

7 Claims, 1 Drawing Sheet

PET WASTE DISPOSAL DEVICE

BACKGROUND OF THE INVENTION

1. Field of the Invention

The present invention generally relates to a pet waste disposal device in the form of a receptacle or fitting that is generally funnel shaped and provided with a reduced diameter lower end connected to the cleanout fitting conventionally provided for sewer systems and located externally of a residential home or other building with the receptacle including a pivotal closure lid to provide access thereto from any position exteriorly of the building and a water inlet to which a garden hose or other supply pipe is connected with the water inlet including a unique arrangement of nozzles for flushing and cleaning the interior surface of the receptacle so that pet waste may be picked up from the yard or other areas and deposited into the receptacle without entering the home or other building. The device may be constructed of metal or plastic and is connected to the cleanout adapter by utilizing conventional plumbing procedures and a control valve is provided for the water inlet to enable selective operation of the flushing operation.

2. Information Disclosure Statement

Efforts have been made to provide for removal and disposal of pet waste and, in some localities, it is required that pet owners dispose of pet waste in a sanitary manner so that it does not become a health hazard. The following U.S. patents are relevant to this invention but none of them disclose the concept of providing a housing or receptacle mounted exterior of a building in communication with the sewer line to enable pet waste to be deposited therein with the receptacle including a closure lid and a structure for effectively flushing the pet waste into the sewer line and cleaning the interior of the receptacle to maintain sanitary conditions.

| 788,721 | S. A. Johnson | May 2, 1905 |
|---|---|---|
| 2,831,488 | G. A. Anderson | April 22, 1958 |
| 2,990,845 | D. W. Sklash | July 4, 1961 |
| 3,734,057 | G. Lee | May 22, 1973 |
| 3,771,491 | A. Hunter | Nov. 13, 1973 |
| 4,228,554 | A. Tumminaro | Oct. 21, 1980 |
| 4,242,763 | J. Walker | Jan. 6, 1981 |
| 4,432,498 | A. L. Clements | Feb. 21, 1984 |
| 4,593,645 | H. P. Dingler | June 10, 1986 |

SUMMARY OF THE INVENTION

An object of the present invention is to provide a pet waste disposal device which includes a generally funnel shaped receptacle having a closure lid at the upper end thereof and having the lower, smaller end connected with a sewer line cleanout fitting located exteriorly of a building so that pet waste may be easily deposited into the receptacle for discharge into the sewer line.

Another object of the invention is to provide a pet waste disposal device in accordance with the preceding object in which the receptacle includes a water inlet structure connected to a water supply line such as a garden hose and provided with unique discharge nozzle arrangements within the receptacle to flush pet waste into the sewer line and to clean the interior surfaces of the receptacle in order to maintain sanitary conditions.

A further object of the invention is to provide a pet waste disposal device in accordance with the preceding objects in which the water inlet includes a downwardly directed nozzle and a tangentially directed nozzle to provide a combined downward flushing action and swirling or peripheral movement of water around the interior of the receptacle.

Still another object of the invention is to provide a pet waste disposal device which can be easily installed by merely removing the normally provided plug for the cleanout fitting and inserting the lower end of the receptacle into the open end of the cleanout fitting with the receptacle being securely and sealingly connected thereto in accordance with appropriate plumbing practices with a garden hose being conveniently utilized to connect a source of water to the device for flushing pet waste into the sewer line and cleaning the interior surface of the receptacle by flushing it with water.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
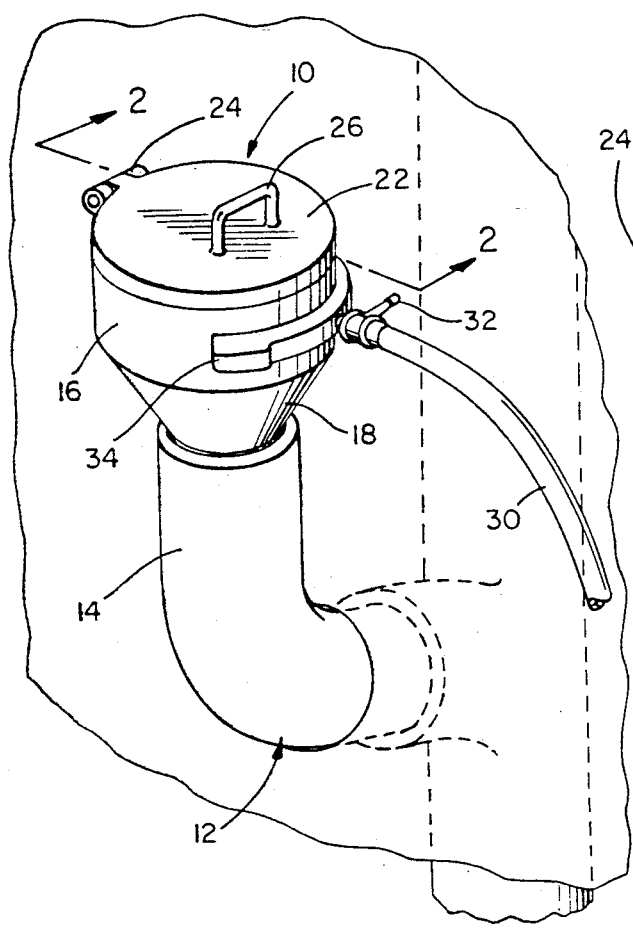
FIG. 1 is a perspective view of the pet waste disposal device illustrating a typical installation exteriorly of a building and connected to the conventionally provided cleanout fitting.

The pet waste disposal device 10 of the present invention is illustrated in connecting relation to a cleanout fitting generally designated by numeral 12 that is a conventional component of and connected with a vertical sewer line, sewer line vent or stack oriented vertically or in any other position interiorly of the building or beneath the lawn. The cleanout fitting includes an open ended fitting 14 normally provided with a removable plug which is usually secured in place by a screw threaded fitting but can be secured in place by a metallic seal or a seal of other material in accordance with local building and plumbing codes. The pet waste disposal device 10 of the present invention is connected directly to the cleanout fitting 12 by removing the existing closure plug and inserting the pet waste disposal device into the opening and connecting it thereto in a secure and sealed manner also in accordance with accepted plumbing practices and local building codes.

The pet waste disposal device 10 includes a generally cylindrical housing or receptacle 16 having a lower end portion that tapers inwardly at 18 and terminating in a cylindrical lower discharge 20 thus forming a generally funnel shaped receptacle having an open upper end that is closed by a closure lid 22 that is pivotally connected to the receptacle 16 by a hinge 24 and provided with an upwardly projecting loop handle 26 to enable the closure lid 22 to be opened and closed. The hinge 24 includes a pair of lugs on the receptacle 16 and a single lug on the lid 12 that is received between the pair of lugs with a hinge pin extending therethrough which is of conventional construction. A latch, key operated lock, padlock or the like may be associated with the lid in order to preclude unauthorized access to the sewer line. The dimensional characteristics of the device may vary but the internal diameter of the open upper end of the receptacle 16 should be sufficient to enable entry of a shovel used for the purpose of removing pet waste from a lawn or the like. The tubular discharge end 20 of the receptacle 16 may have an external diameter adapting it to fit into various standard size cleanout openings. Adapters may be provided for the cleanout opening to enable the discharge end 20 to be constructed of one size with the adapters enabling it to effectively be fitted into, sealed and supported from larger sized cleanout openings. The open upper end of the receptacle 16 is provided with an inwardly extending flange 28 on the inner surface thereof to retain water from migrating out of the upper end thereof during us in a manner described hereinafter.

Figure 2:
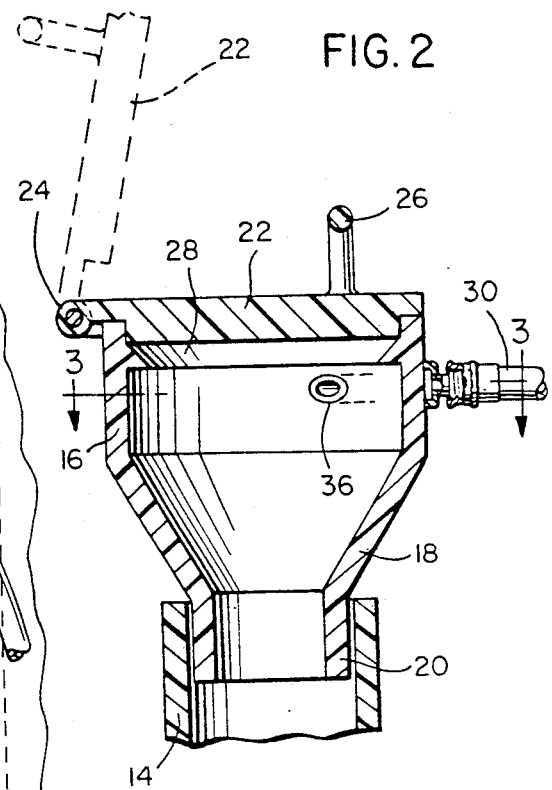
FIG. 2 is a vertical, sectional view taken substantially upon a plane passing along section line 2—2 on FIG. 1 illustrating structural details of the present invention.
Figure 3:
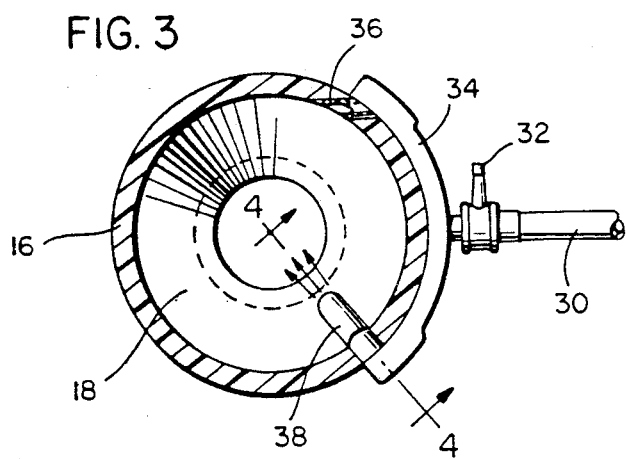
FIG. 3 is a transverse, sectional view taken substantially upon a plane passing along section line 3—3 on FIG. 2 illustrating further structural details of the invention.
Figure 4:
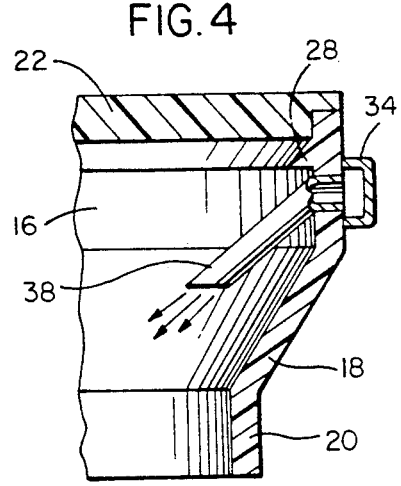
FIG. 4 is a fragmental, sectional view taken substantially upon a plane passing along section line 4—4 on FIG. 3 illustrating further structural details of the water inlet structure.

In order to flush waste material that has been placed in the receptacle 16, a water supply line 30 which may be in the form of a conventional hose is communicated with the upper end portion of the receptacle 16 as illustrated in the drawings for discharging water interiorly of the receptacle 16 to flush waste material downwardly into the sewer line. The hose 30 is connected in a conventional manner to a valve structure 32 communicated with a peripherally extending, channel shaped water manifold 34 formed on the exterior surface or incorporated into the receptacle 16 for flow of water peripherally on the interior surface of the receptacle 16 and downwardly towards the discharge end 20. At one end of the manifold 34, the receptacle 16 is provided with a water inlet port or passageway 36 that is inclined into generally tangential relation to the inner surface of the receptacle 16 so that water entering the receptacle 16 will move in a swirling path around the interior of the receptacle 16 in a manner somewhat similar to the swirling motion of water flushing the interior of a toilet commode. The swirling movement of the water is generally indicated by arrows in FIG. 2 and the inwardly extending flange 28 at the upper end of the receptacle 16 precludes this water from migrating upwardly and out of the open upper end of the receptacle 16. This enables the flushing operation to be conducted while the lid is open and permits deposit of pet waste into the receptacle 16 while the flushing water is swirling about the interior thereof without the water splashing out of or migrating out of the receptacle 16 due to its movement up the internal surface thereof. The other end of the channel shaped manifold 34 is provided with an inwardly and downwardly extending discharge nozzle 38 as illustrated in FIG. 4 with the inner end of the nozzle 38 being directed downwardly toward the central portion of the discharge end 20 of the receptacle 16. This assures that the pet waste material is discharged from the inwardly inclined surfaces and the interior surface of the discharge end 20 of the receptacle 16 even if the pet waste material contains substantial solid materials.

The device can be easily installed by most homeowners in a relatively short period of time and will adapt to most outside cleanout fittings by removing the cleanout plug, providing an adapter, if necessary, to enable the device to be securely mounted on the cleanout fitting with the water line or hose then being easily connected. The device may be constructed of plastic or metal material and a conventional P-trap may be utilized between the discharge end 20 of the receptacle 16 and the cleanout opening if the P-trap is desired or required by local building codes. The water valve 32 preferably is a two-way water valve so that water can be discharged in either direction in the channel shaped manifold 34 for selectively discharging water through the port 36 or the nozzle 38 and the valve may have the capability of discharging water through both the port 36 and the nozzle 38 at the same time if desired. The receptacle 16 is generally in the shape of a funnel with a large upper opening closed by the hinged lid with the smaller lower discharge end 20 fitting either into a P-trap or into the cleanout fitting. The lid 22 may be provided with a gasket for sealing engagement with the receptacle 16 or the lid may telescope into the upper end of the receptacle 16 in a generally snap fitting engagement to effectively close the unit. The water valve 32 may also control the pressure of water admitted into the receptacle 16 thereby controlling the turbulence, swirling and splashing of the water to effectively clean the interior surface of the receptacle 16 and flush the waste material into the sewer line. The downwardly extending jet of water discharged from the nozzle 38 breaks up any large pieces of relatively solid material which enables it to be more efficiently flushed into the sewer line.

When installing the device, it is necessary to locate the sewer line cleanout which is normally located exteriorly of the building or residence near the kitchen or bathroom wall where a vertical vent stack or other vertical pipe would be located. In some instances, the sewer cleanout may be vertically oriented or even oriented in spaced relation to the building wall such as in the lawn. The cleanout plug is removed and the internal dimension characteristics of the sewer line cleanout are determined by measurement and a proper sized adapter is screwed into the cleanout and tightened by any suitable tool. Reducing adapters of various size characteristics are available in plumbing supply establishments. In some instances, the cleanouts may be installed so that the cleanout opening and plug are oriented in an inclined position usually at 45° or 22° rather than 90° in which event an adapter can be obtained at a plumbing supply establishment to provide a vertically opening fitting for receiving the lower end of the receptacle or a P-trap. A short length of pipe should be installed in the adapter and this can be accomplished by utilizing a glue such as a silicone glue or ABS glue with glue being applied to one end of the short length of pipe and pushed into the adapter which is threaded into the cleanout. The same glue is placed on one end of the P-trap or curved pipe which is pressed into or onto the short section of pipe extending into the cleanout adapter with the open end of the P-trap facing upwardly. The bottom opening 20 of the receptacle 16 is then glued into the P-trap with the water inlet fitting facing the nearest water supply line or hose bib. After installation, a standard garden water hose may be connected and, if desired, an anti-siphon device should be installed on the water supply line or hose bib. The device is then ready for use and, normally, water is turned on prior to depositing pet waste material in order to maintain the device as clean as possible. The valve may be adjusted to vary the water pressure and flow characteristics. It is desirable to close the lid after the waste material is placed therein and water should be permitted to run for at least a few seconds in order to flush the waste material into the sewer. When the pet waste disposal device is not being used, the water supply hose should be turned off at the hose bib or faucet.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A pet waste disposal device comprising a receptacle oriented vertically with an open upper end and a lower discharge end with the open upper end adapted to receive pet waste deposited therein, a closure lid for the upper end of the receptacle, the lower end of the receptacle being tapered and connected to a sewer access means disposed outdoors, said receptacle including water inlet means for discharging water into the interior of the receptacle for flushing pet waste material from the discharge end of the receptacle and means supplying pressurized water to the receptacle through the water inlet means, said water inlet means including a water inlet passage oriented in inclined relation through the periphery of the receptacle and generally tangential to the inner surface thereof for discharge of water in a swirling path, and a downwardly directed water discharge nozzle spaced from the inner wall of the receptacle and circumferentially spaced from the passage for breaking up solid pet waste material for more effective discharge through the discharge end thereof.

2. The structure as defined in claim 1 wherein said receptacle is generally funnel shaped in configuration with the discharge end being smaller than the open upper end, said inlet passage being disposed adjacent the upper end of the receptacle and the nozzle being directed toward the smaller end of the receptacle.

3. The structure as defined in claim 2 together with an inwardly extending peripheral lip adjacent the upper end of the receptacle to prevent upward discharge of water along the interior surface of the receptacle.

4. The structure as defined in claim 3 wherein said receptacle is generally circular in transverse configuration, said water inlet means including an arcuate manifold communicating with the passage and nozzle.

5. In combination, a sewer line having a cleanout fitting terminating in an upwardly opening upper end located outwardly of a building structure and a pet waste disposal device mounted on and supported by said fitting, said pet waste disposal device comprising a generally cylindrical housing having an inwardly tapering lower end telescoped into the upper end of the fitting, said housing having an open upper end, an openable closure lid engaged with the upper end of the housing to enable pet waste to be placed in the housing and means flushing the interior of said housing to flush pet waste from the housing into the sewer line.

6. The combination as defined in claim 5 wherein said means flushing the interior of said housing including an arcuately extending tubular manifold mounted on the external surface of said housing adjacent the upper end thereof, said housing including an angularly extending passage communicating with one end of the manifold to discharge water in a tangential direction around the inner periphery of the upper end portion of the housing to wash the interior surface of the housing and flush pet waste toward the bottom of the housing and into the sewer line, said manifold including an inwardly and downwardly extending nozzle at the end thereof opposite the passage with the nozzle extending downwardly and inwardly within the housing in spaced relation to the interior surface thereof for directing a jet of water downwardly toward the tapered lower end of the housing for breaking up and flushing pet waste material in the housing.

7. The combination as defined in claim 6 wherein said manifold includes a water inlet fitting at the center thereof in arcuately spaced relation to the passage and nozzle, a garden hose attached to said inlet fitting for supplying pressurized water to the manifold, said lid being hingedly connected to the upper end of the housing and including a handle on the exterior thereof for opening and closing the lid, the interior surface of the housing adjacent the upper end thereof including an inwardly extending peripheral lid disposed above the passage and nozzle for preventing upward migration of water along the inner surface of the housing.

* * * * *